US00RE48685E

(19) United States
(12) Reissued Patent
Herrmann et al.

(10) Patent Number: US RE48,685 E
(45) Date of Reissued Patent: Aug. 17, 2021

(54) METHOD FOR CONTROLLING AN ULTRASONIC MACHINING PROCESS

(71) Applicant: Herrmann Ultraschalltechnik GmbH & Co. KG, Karlsbad (DE)

(72) Inventors: Thomas Herrmann, Karlsruhe (DE); Volker Aust, Birkenfeld (DE)

(73) Assignee: HERRMANN ULTRASCHALLTECHNIK GMBH & CO. KG, Karlsbad (DE)

(21) Appl. No.: 15/880,232

(22) Filed: Jan. 25, 2018

Related U.S. Patent Documents

Reissue of:
(64) Patent No.: 8,702,883
Issued: Apr. 22, 2014
Appl. No.: 13/940,743
Filed: Jul. 12, 2013

(30) Foreign Application Priority Data

Jul. 18, 2012 (DE) ..... 10 2012 106 491.1

(51) Int. Cl.
*B23B 37/00* (2006.01)
*B29C 65/08* (2006.01)
(Continued)

(52) U.S. Cl.
CPC ..... *B29C 65/08* (2013.01); *B23K 20/10* (2013.01); *B29C 66/92445* (2013.01);
(Continued)

(58) Field of Classification Search
CPC . B29C 65/08; B29C 66/73921; B29C 66/847; B29C 66/961; B29C 66/45;
(Continued)

(56) References Cited

U.S. PATENT DOCUMENTS 5,435,863 A * 7/1995 Frantz ..... 156/64
5,658,408 A * 8/1997 Frantz et al. ..... 156/64
(Continued)

FOREIGN PATENT DOCUMENTS

DE 34 29 776 C2 2/1986
DE 37 23 333 A1 1/1989
(Continued)

OTHER PUBLICATIONS

Dukane Corporation, DPC IV Plus Generator User's Manual, pp. 81-84. (Year: 1997).*

*Primary Examiner* — Elizabeth L McKane
(74) *Attorney, Agent, or Firm* — Paul & Paul

(57) ABSTRACT

Invention relating to a method for controlling an ultrasonic machining, in which an ultrasonic vibration is transmitted via a sonotrode into the material to be machined. During the first machining interval, a first welding variable of the group S, consisting of the frequency f and the amplitude ü of the ultrasonic vibration, the force F, which the sonotrode exerts on the material to be machined, the power P, which the generator delivers, and the speed v, with which the sonotrode is moved in the direction of the material to be machined, is kept constant until a first target variable of the group Z adopts a predetermined value. During an adjoining second machining interval, a second welding variable of the group S is kept constant until a second target variable of the group Z adopts a predetermined value, wherein the first and the second target variable differ.

14 Claims, 1 Drawing Sheet

(51) Int. Cl.
*B23K 20/10* (2006.01)
*B29C 65/00* (2006.01)

(52) U.S. Cl.
CPC .... *B29C 66/93431* (2013.01); *B29C 66/9512* (2013.01); *B29C 66/9516* (2013.01); *B29C 66/961* (2013.01); *B29C 66/942* (2013.01)

(58) Field of Classification Search
CPC ..... B29C 66/9516; B29C 66/9512; B29C 66/1122; B29C 66/30223; B29C 66/80; B29C 66/8167; B29C 66/8322; B29C 66/92211; B29C 66/92431; B29C 66/92443; B29C 66/92445; B29C 66/92611; B29C 66/92921; B29C 66/934; B29C 66/9511; B29C 65/8215; B29C 66/8224; B29C 66/71; B29C 66/93441; B29C 66/8122; B29C 66/9517; B29C 66/9513; B29C 66/932; B29C 66/9592; B29C 66/93431; B29C 66/942; B29K 2905/02; B29K 2101/12; B23K 20/10
See application file for complete search history.

(56) References Cited

U.S. PATENT DOCUMENTS 5,846,377 A * 12/1998 Frantz et al. ..... 156/359
8,052,816 B2 * 11/2011 Klinstein ..... B29C 65/08 156/64

FOREIGN PATENT DOCUMENTS

| | | | |
|---|---|---|---|
| DE | 43 21 874 | A1 | 1/1995 |
| DE | 692 16 761 | T2 | 7/1997 |
| DE | 101 26 943 | A1 | 12/2002 |
| DE | 10 2007 053 853 | A1 | 5/2009 |
| DE | 11 2007 001 925 | T5 | 7/2009 |
| WO | 2004 096 480 | A1 | 11/2004 |

* cited by examiner

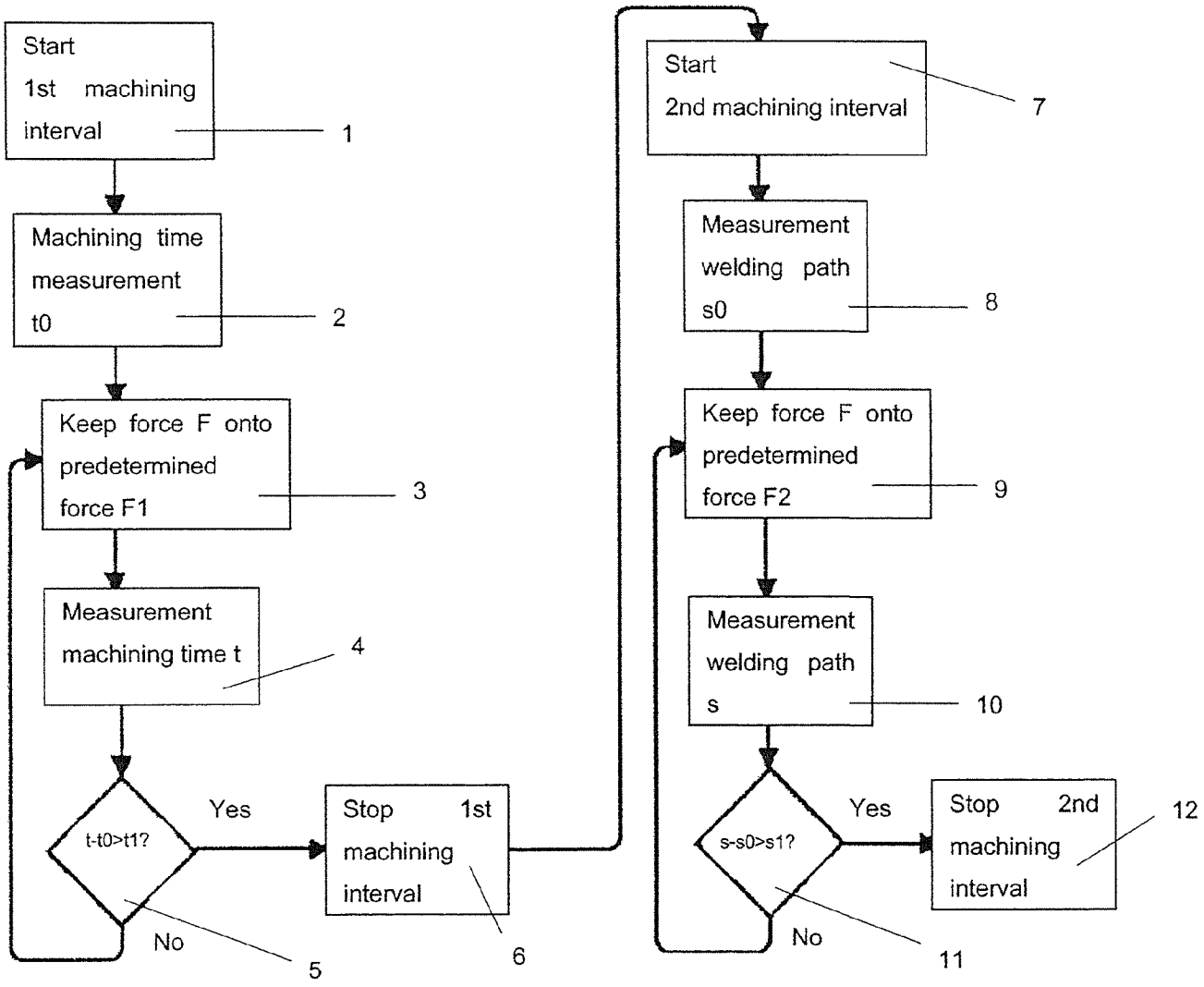
Start
1st machining
interval
1
Machining time
measurement
t0
2
Keep force F onto
predetermined
force F1
3
Measurement
machining time t
4
t-t0>t1?
Yes
No
5
Stop 1st
machining
interval
6
Start
2nd machining interval
7
Measurement
welding path
s0
8
Keep force F onto
predetermined
force F2
9
Measurement
welding path
s
10
s-s0>s1?
Yes
No
11
Stop 2nd
machining
interval
12

METHOD FOR CONTROLLING AN ULTRASONIC MACHINING PROCESS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

The present invention relates to a method for controlling an ultrasonic machining process and, in particular, a method for controlling an ultrasonic welding process. During ultrasonic welding, two components are frequently connected to one another by inner friction in the joining zone. For this purpose, an ultrasonic welding apparatus, consisting of a generator, a converter and a sonotrode, is used. The generator produces an electric alternating voltage, which is converted with the aid of the converter into a mechanical vibration. The converter in turn makes the sonotrode connected therewith carry out an ultrasonic vibration.

The sonotrode made to carry out an ultrasonic vibration then transmits the ultrasonic vibration under pressure to one of the two components to be connected. If the components to be connected touch, boundary surface friction occurs between the two components in the so-called joining or welding zone and, as a result, local heating of the boundary surfaces occurs. If the heating is so great that the boundary surfaces melt, the two components are welded. The two components are generally pressed onto one another with the aid of the sonotrode.

A weld connection with a short welding time can be produced by ultrasonic welding as the welding energy is provided so as to be virtually limited to the joining zone.

In order to achieve an optimal welding result, it is necessary for the welding process to take place as rapidly as possible in order to avoid heating the material outside the joining zone. The longer the welding process lasts, the more heat dissipates from the joining zone and heats the components. On the other hand, the welding time has to be at least long enough for a uniform material melting to occur in the joining zone, as only then is a lasting weld connection ensured.

There are applications, in which the best welding result is achieved in the shortest time if the force, with which the sonotrode is pressed onto the components, is varied during the welding process. It is thus, for example possible, to press the sonotrode onto a component with a first force $F_1$ during a first time interval and to press the sonotrode onto this component with a second force $F_2$ during an adjoining second time interval, wherein $F_2$ is less than $F_1$. In this case, the first time interval is selected such that, at the end of the first time interval, the beginning of the melting process can be expected. As the contact faces of the two components to be connected then melt and consequently become soft, the further welding process can be carried out with less force, so the welding quality is improved.

Because of sensitive component geometries and structures, other processes require smaller welding forces during the first time interval. Only after the beginning of the plastification can the welding force be increased in a following time interval.

The known methods are, however, not optimal for all applications. Thus, for example, the necessary welding period up to the melting of the joining faces also depends on the flatness of the joining faces. Because of component tolerances, the optimal welding period for welding a first pair of components can therefore differ from the optimal welding period for welding a second pair of components. In addition, the use of two or more forces, with which the sonotrode is pressed onto the component, is not always the best solution to obtain an optimal welding result.

Proceeding from the described prior art, it is therefore the object of the present invention to disclose a method for controlling an ultrasonic machining process, with which a reliable processing result can be achieved in a large number of application possibilities.

According to the invention, this object is achieved in that, during a first machining interval, a first welding variable of the group S, consisting of the frequency f of the ultrasonic vibration of the sonotrode, the amplitude ü of the ultrasonic vibration of the sonotrode, the force F, which the sonotrode exerts on the material to be machined, the power P, which the generator consumes, and the speed v, with which the sonotrode moves in the direction of the first component, is kept constant until a first target variable of the group Z, consisting of the force F, the power P, the welding time t since the beginning of this machining interval, during which the excited sonotrode transmits the ultrasonic vibration under a specific pressure into the material to be machined, the welding path s, which the sonotrode has covered since the beginning of the machining interval in the direction of the first component, and the energy E, calculated from the product of the power P and the welding time t, adopts a predetermined value.

Obviously, a plurality of welding variables of the group S can also be kept constant.

It is seen that some variables, such as, for example, the force F, are suitable both as a welding variable and as a target variable. However, it is obvious that no variable which is kept constant as a welding variable can be selected as the target variable. If the force F which the sonotrode exerts on the material to be machined is therefore kept constant during the first machining interval, the target variable cannot be the force F. However, the target variable could, for example, be the power P, which the generator delivers.

During the first machining interval, a first force could therefore be applied by the sonotrode to the material to be machined until the power P which the generator delivers adopt a predetermined value or exceeds it.

According to the invention, it is then furthermore provided that, during a second machining interval, which adjoins the first machining interval, a second welding variable of the group S is kept constant until a second target variable of the group Z adopts a predetermined value, wherein the first and the second target variable differ.

Thus, for example, during a first machining interval, a specific force could be applied for a specific time t and, in a second machining interval, the amplitude ü could be kept constant until a specific energy E has been delivered by the generator.

In a preferred embodiment of the method, the first and the second welding variable are the same. However, this does not mean that the welding variable is kept constant at the same value in the first and in the second machining interval. On the other hand, the welding variable will generally be kept constant at a different value in the first machining interval than in the second machining interval.

Thus, for example, during a first machining interval, a first force could be applied for a specific time t and a second force could be applied in a second machining interval until a specific energy E has been delivered by the generator.

In a further particularly preferred embodiment, both in the first and in the second machining interval, the force F, which the sonotrode exerts on one of the components, is selected as the welding variable. It has namely been shown that by applying specific forces to the material, welding results that can be reproduced well can be achieved. As, the material pieces to be consecutively machined differ slightly under some circumstances, however, the period for which the sonotrode machines the material is then, for example, varied between the individual materials in that the target variables are selected such that they are reached at different speeds depending on the material to be machined.

In a further particularly preferred embodiment, it is provided that, during the first machining interval, a third target variable of the group Z is detected and, depending on the result of the detection, the second target variable is selected. In other words, at the beginning of the first machining interval, it is not yet established which target variable of the group Z is selected for the second machining interval. For example, during the first machining interval, the force F, which the sonotrode exerts on the material to be machined, could be kept constant, until the path s, which the sonotrode has covered since the beginning of the machining interval in the direction of the material to be machined, has reached a predetermined value. If, at the same time, the time is measured, the target variable for the second machining interval can be made to depend upon whether the predetermined path s has been reached within a specific time interval or not.

In a preferred embodiment, it is therefore provided that the third target variable is the welding time t.

Obviously, it is also possible for two target variables to be detected during a machining interval, for example a first target variable and a fourth target variable of the group Z, and for the machining interval to end when one of the two target variables adopts it predetermined value.

Furthermore, it is provided in a preferred embodiment that an upper and/or lower limit optionally depending on the welding time t is predetermined for the first and/or second target variable and, when the upper limit is exceeded or the lower limit is fallen below, the machining interval is ended and a transition is made into the next machining interval or the welding process is discontinued.

In other words, an observation of the ultrasonic machining control takes place. If the machining should not take place within a predetermined tolerance band, the machining can either be discontinued or a transition can be made into the next machining interval.

Obviously, the method according to the invention is not limited to two machining intervals. Rather, it is possible to select three or even still more machining intervals, wherein directly adjoining machining intervals preferably use different target variables in each case.

Further advantages, features and application possibilities become clear with the aid of the following description of a preferred embodiment and the associated FIGURE. In the drawing:

FIG. 1 shows a flow chart of a preferred embodiment.

FIG. 1 shows a flow chart of a preferred embodiment of the method according to the invention. The first machining interval starts in step 1. The machining time t0 is measured in step 2. This measurement is merely used to determine the starting time.

The sonotrode is then pressed with the predetermined force $F_1$ onto the workpiece to be machined in step 3. The force F is selected as the welding variable. It is obvious that instead of the force F, a different welding variable of the group S could have also been selected.

In step 4, the machining time t is measured. The machining time t is the target variable which has been selected for the first machining interval. A check is now made in step 5 whether since the beginning of the machining time measurement in step 2 a predetermined time interval t1 has already been exceeded or not. If the predetermined time period t1 has not yet been exceeded, the method continues with step 3, i.e. the sonotrode continues to be pressed with the predetermined force $F_1$ onto the workpiece to be machined and, in step 4, the machining time t is measured again until the predetermined time period t1 has been reached. In this case, the first machining interval ends in step 6. In step 7, the second machining interval starts. The welding path s0 is measured here in step 8, i.e. the position of the sonotrode relative to the workpiece or a counter-tool, on which the workpiece is positioned.

In step 9, the sonotrode is now pressed with a predetermined force $F_2$ onto the workpiece to be machined. Ultrasonic machining takes place.

In step 10, the welding paths is measured again. A check is now made in step 11 whether, since the beginning of the measurement in step 8, the sonotrode has moved relative to the workpiece by a distance which is greater than the predetermined welding path s1. If the predetermined welding path s1 has not yet been reached, the process is continued with step 9. If the desired welding path s1 has been reached, the second machining interval ends in step 12.

Since the machining method according to the invention provides the division of the machining into at least two machining intervals, the target variables being selected differently, a very good welding result can be achieved.

The invention claimed is:

[1. Method for controlling an ultrasonic machining process, in which an ultrasonic vibration of the frequency f is transmitted with the aid of a sonotrode made to carry out an ultrasonic vibration under a pressure into the material to be machined, wherein, during a first machining interval, a first welding variable of the group S, consisting of the frequency f of the ultrasonic vibration, the amplitude ü of the ultrasonic vibration of the sonotrode, the force F, which the sonotrode exerts on the material to be machined, the power P, which the generator delivers, and the speed v, with which the sonotrode is moved in the direction of the material to be machined, f is kept constant) until a first target variable of the group Z, consisting of the force F, the power P, the welding time t since the beginning of this machining interval, during which the excited sonotrode transmits the ultrasonic vibration under pressure into the material to be machined, the welding path s, which the sonotrode has covered since the beginning of the machining interval, and the energy E, calculated from the product of P and t, adopts a predetermined value, and, during a second machining interval, which adjoins the first machining interval, a second welding variable of the group S is kept constant until a second target variable of the group Z adopts a predetermined value, wherein the first and the second target variable differ.]

[2. Method according to claim 1, characterised in that the first and the second welding variable are the same.]

[3. Method according to claim 2, characterised in that the first and the second welding variable are the force F, which the sonotrode exerts on the product to be machined.]

4. [Method according to any one of claims 1 to 3, characterised in that,] *Method for controlling an ultrasonic machining process, in which an ultrasonic vibration of the frequency f is transmitted with the aid of a sonotrode made*

*to carry out an ultrasonic vibration under a pressure into the material to be machined, wherein, during a first machining interval, a first welding variable of the group S, consisting of the frequency f of the ultrasonic vibration, the amplitude ü of the ultrasonic vibration of the sonotrode, the force F, which the sonotrode exerts on the material to be machined, the power P, which the generator delivers, and the speed v, with which the sonotrode is moved in the direction of the material to be machined, is kept constant until a first target variable of the group Z, consisting of the force F, the power P, the welding time t since the beginning of this machining interval, during which the excited sonotrode transmits the ultrasonic vibration under pressure into the material to be machined, the welding path s, which the sonotrode has covered since the beginning of the machining interval, and the energy E, calculated from the product of P and t, adopts a predetermined value, and, during a second machining interval, which adjoins the first machining interval, a second welding variable of the group S is kept constant until a second target variable of the group Z adopts a predetermined value, wherein the first and the second target variable differ, and wherein* during the first machining interval, a third target variable of the group Z is detected and the second target variable is selected depending on the result of the detection.

5. Method according to claim 4, [characterised in that] *wherein* the third target variable is the welding time t.

[6. Method according to any one of claims 1 to 3, characterised in that the first machining interval ends when the first target variable adopts the predetermined value or when a fourth target variable of the group Z adopts a predetermined value.]

7. [Method according to any one of claims 1 to 3, characterised in that] *Method for controlling an ultrasonic machining process, in which an ultrasonic vibration of the frequency f is transmitted with the aid of a sonotrode made to carry out an ultrasonic vibration under a pressure into the material to be machined, wherein, during a first machining interval, a first welding variable of the group S, consisting of the frequency f of the ultrasonic vibration, the amplitude ü of the ultrasonic vibration of the sonotrode, the force F, which the sonotrode exerts on the material to be machined, the power P, which the generator delivers, and the speed v, with which the sonotrode is moved in the direction of the material to be machined, is kept constant until a first target variable of the group Z, consisting of the force F, the power P, the welding path s, which the sonotrode has covered since the beginning of the machining interval, and the energy E, calculated from the product of P and the welding time t since the beginning of this machining interval, during which the excited sonotrode transmits the ultrasonic vibration under pressure into the material to be machined, adopts a predetermined value, and, during a second machining interval, which adjoins the first machining interval, a second welding variable of the group S is kept constant until a second target variable of the group Z adopts a predetermined value, wherein the first and the second target variable differ, and wherein* an upper and/or lower limit [optionally depending on the welding time t] is predetermined for the first and/or the second target variable and, when the upper limit is exceeded or the lower limit is fallen below, the machining interval is ended and a transition is made into the next machining interval or the welding process is discontinued *wherein the upper and/or the lower limit is dependent on the welding time.*

8. [Method according to any one of claims 1 to 3, characterised in that] *Method for controlling an ultrasonic machining process, in which an ultrasonic vibration of the frequency f is transmitted with the aid of a sonotrode made to carry out an ultrasonic vibration under a pressure into the material to be machined, wherein, during a first machining interval, a first welding variable of the group S, consisting of the frequency f of the ultrasonic vibration, the amplitude ü of the ultrasonic vibration of the sonotrode, the force F, which the sonotrode exerts on the material to be machined, the power P, which the generator delivers, and the speed v, with which the sonotrode is moved in the direction of the material to be machined, is kept constant until a first target variable of the group Z, consisting of the force F, the power P, the welding time t since the beginning of this machining interval, during which the excited sonotrode transmits the ultrasonic vibration under pressure into the material to be machined, the welding path s, which the sonotrode has covered since the beginning of the machining interval, and the energy E, calculated from the product of P and t, adopts a predetermined value, and, during a second machining interval, which adjoins the first machining interval, a second welding variable of the group S is kept constant until a second target variable of the group Z adopts a predetermined value, wherein the first and the second target variable differ, and wherein* during a third machining interval, which adjoins the second machining interval, a third welding variable of the group S is kept constant until a fifth target variable of the group Z adopts a predetermined value, wherein the second and the fifth target variable differ.

9. Method according to claim 8, [characterised in that] *wherein* more than three machining intervals are provided, during which, in each case, a welding variable of the group S is kept constant until, in each case, a target variable of the group Z adopts a predetermined value.

*10. Method according to claim 4, wherein the first and the second welding variable are the same.*

*11. Method according to claim 10, wherein the first and the second welding variable are the force F, which the sonotrode exerts on the product to be machined.*

*12. Method according to claim 7, wherein the first and the second welding variable are the same.*

*13. Method according to claim 12, wherein the first and the second welding variable are the force F, which the sonotrode exerts on the product to be machined.*

*14. Method according to claim 8, wherein the first and the second welding variable are the same.*

*15. Method according to claim 14, wherein the first and the second welding variable are the force F, which the sonotrode exerts on the product to be machined.*

*16. Method for controlling an ultrasonic machining process, in which an ultrasonic vibration of the frequency f is transmitted with the aid of a sonotrode made to carry out an ultrasonic vibration under a pressure into the material to be machined, wherein, during a first machining interval, a first welding variable of the group S, consisting of the frequency f of the ultrasonic vibration, the amplitude ü of the ultrasonic vibration of the sonotrode, the force F, which the sonotrode exerts on the material to be machined, the power P, which the generator delivers, and the speed v, with which the sonotrode is moved in the direction of the material to be machined, is kept constant until a first target variable of the group Z, consisting of the force F, the power P, the welding time t since the beginning of this machining interval, during which the excited sonotrode transmits the ultrasonic vibration under pressure into the material to be machined, the welding path s, which the sonotrode has covered since the beginning of the machining interval, and the energy E, calculated from the product of P and t, adopts a predeter-*

*mined value, and, during a second machining interval, which adjoins the first machining interval, a second welding variable of the group S is kept constant until a second target variable of the group Z adopts a predetermined value, wherein the first and the second target variable differ, wherein said first target variable and a fourth target variable of the group Z are detected during the first machining interval, and wherein the first machining interval ends when the first target variable adopts the predetermined value or wherein the first machining interval ends also when the fourth target variable of the group Z adopts a predetermined value, whichever occurs first.*

*17. Method according to claim 16, wherein the first and the second welding variable are the same.*

*18. Method according to claim 17, wherein the first and the second welding variable are the force F, which the sonotrode exerts on the product to be machined.*

* * * * *